(12) United States Patent
Matsumoto

(10) Patent No.: US 7,692,885 B2
(45) Date of Patent: Apr. 6, 2010

(54) LENS BARREL

(75) Inventor: Satoru Matsumoto, Saitama (JP)

(73) Assignee: Fujinon Corporation, Saitama (JP)

( * ) Notice: Subject to any disclaimer, the term of this patent is extended or adjusted under 35 U.S.C. 154(b) by 11 days.

(21) Appl. No.: 12/040,466

(22) Filed: Feb. 29, 2008

(65) Prior Publication Data

US 2008/0239521 A1 Oct. 2, 2008

(30) Foreign Application Priority Data

Mar. 27, 2007 (JP) .......................... P2007-081614

(51) Int. Cl.
G02B 15/14 (2006.01)
G02B 7/02 (2006.01)

(52) U.S. Cl. .................. 359/822; 359/694; 359/700

(58) Field of Classification Search ......... 359/694–700, 359/819–823

See application file for complete search history.

(56) References Cited

U.S. PATENT DOCUMENTS 7,403,348 B2 * 7/2008 Kuroda et al. ............... 359/823

FOREIGN PATENT DOCUMENTS

JP 2003-329912 A 11/2003

* cited by examiner

*Primary Examiner*—Mohammed Hasan
(74) *Attorney, Agent, or Firm*—Birch, Stewart, Kolasch and Birch, LLP

(57) ABSTRACT

A lens barrel capable of forming high-accuracy barrel body and simply adjusting a tilt and a position in an optical axis direction without using dedicated portions is provided. The lens barrel includes a front barrel and a rear barrel. An inner diameter of a portion, containing a focus lens of the front barrel, is 1.15 times or more as large as an inner diameter of a portion containing a zoom lens of the rear barrel. The rear barrel and the front barrel are coupled by a coupling screw. A convex portion has an adjustment face for adjusting a distance between the focus lens and the zoom lens and is formed on a coupling face of the front barrel. A convex portion includes a reference face serving as a reception portion and is formed on the rear barrel.

3 Claims, 21 Drawing Sheets

LENS BARREL

CROSS-REFERENCE TO RELATED APPLICATIONS

This application is based on and claims priority under 35 USC 119 from Japanese Patent Application No. 2007-081614 filed Mar. 27, 2007.

BACKGROUND

1. Technical Field

The present invention relates to a plastic lens barrel for a projector, particularly to a plastic lens barrel where an entire length of the lens is more than 150 mm and a wide zoom lens having a super-wide angle is mounted.

2. Related Art

A projector enlarging and projecting an image on a screen by employing a projection lens is known. The projector is generally used in indoors, and thus a super-wide angle lens is used in a front lens, and a zoom lens including a lens group of a variable-magnification optical system is disposed as a rear lens. In a projection image, a size of image formed on a screen can be adjusted by changing a distance between the super-wide angle lens of the front lens and the zoom lens of the rear lens.

Barrel portions containing the lens are generally made of resin because of costs and weight. Hence, it is difficult to secure optical axis accuracy as a whole. For example, in a barrel provided with a wide zoom lens used in a projector having a screen size of 100 inch or more formed at a projection distance of 3 to 4 m, the entire length of the barrel increases, and thus it is very difficult to form the barrel in high accuracy. Particularly, in a case of a wide zoom lens used in a projector, a decrease in size is contrived by making a zoom lens group (a variable magnification optical system) of a rear lens have a small diameter. However, since a front group lens has the super-wide angle, a diameter of the front group lens increases. So the barrel containing them has a step since the diameter of the barrel is remarkably changed in a connection portion. The step in the lens barrel deteriorates stability in barrel formation, so that time and costs should be spent in order to secure size accuracy of portions in the lens barrel. In this case, sometimes the target accuracy may not be obtained even when time and costs are spent on the target accuracy.

As described above, when using the barrel having low accuracy in optical axis, quality of an image projected on a screen deteriorates. Hence, there has been a need to adjust an optical axis tilt and a position of the lens when the super-wide angle lens of the front group are built into the barrel.

In the following Patent Document 1 (JP-A-2003-329912), a method in which the tilt of a lens can be simply adjusted is provided. According to the method, by forming a plurality of positioning grooves on a lens abutting surface and installing an adjusting washer having two lens abutting portions projecting to an outside diameter side and one positioning portion on a circumference, it is possible to position the lens abutting surface and optionally make the tilt in an optional direction correctable.

As described above, in a barrel body where a lens having a super-wide angle is mounted and an entire length of the lens is more than 150 mm, diameters of the front lens and the rear lens are remarkably different from each other. Thus, the barrel has a step, and so there is problem that it is difficult to secure formation accuracy. By using the method disclosed in the Patent Document 1, even when optical accuracy of the barrel is corrected, it is needed that employing a plurality of expensive spacers in order to adjust the front lens, and there is a problem of spending unnecessary time such as attachment of the spacer and adjustment of sheet number.

It is an object of the invention to provide a lens barrel capable of improving accuracy in size at the time of forming without an increase in costs and simply adjusting a tilt and a position in an optical axis direction.

SUMMARY

[1] According to an aspect of the invention, a lens barrel for a projector including a front group lens projecting an image on a screen and a rear group lens formed of a plurality of lenses shifting through a cam barrel, respectively. The lens barrel includes a rear barrel which is formed of resin and contains the rear group lens; and a front barrel which is formed of resin and contains the front group lens. The front group lens is disposed to be focusable. An inner diameter of a portion, containing the front group lens of the front barrel, is 1.15 times or more as large as an inner diameter of a portion containing the rear group lens of the rear. The front barrel and the rear barrel are coupled by a connection portion.

[2] According to the lens barrel of [1], three reference faces may be disposed on three locations dividing a circumference centered on an optical axis into three equal portions. The three reference faces may have the same positions in an optical axis direction. And the three reference faces may be integrally formed on coupling face of the front barrel or coupling face of the rear barrel. And three adjustment faces may be disposed on three locations dividing a circumference centered on an optical axis into three equal portions. The three adjustment faces may have the same positions in the optical axis direction. The three adjustment faces may be integrally formed as one set on the other coupling face. And the plural sets of the adjustment faces may be provided with change of the positions in the optical axis direction.

[3] According to the lens barrel of [1], N adjustment portions may be disposed on N locations which are at least three or more formed as one set. And plural sets of the adjustment portions may be provided on any one or both of the coupling faces of the front barrel and the rear barrel. And the plural sets of the adjustment portions may includes a combination in which at least one position of one set in the optical axis direction is set to be different in the optical axis from another position of the one set. And a combination of positions of one set may be different in the optical axis direction from a combination of positions of another set.

[4] According to the lens barrel of [3], the N adjustment portions formed as one set may be arranged at an equal distance from each other on the circumference centered on the optical axis.

According to [1], [2], [3] or [4], it is provided that a plastic lens barrel where a wide zoom lens difficult to secure accuracy in the optical axis as a whole and having an entire length thereof more than 150 mm is mounted and high step is formed between the rear group lens having a small outer diameter of the lens and the front group lens having a large outer diameter of the lens. Even in this case, the plastic barrel is divided into two in a portion having the step, and thus it is possible to secure accuracy in size of the portions of the barrel at the time of forming and it is possible to adjust a distance between the front group lens and the rear group lens, a tilt (a tilt of the optical axis), or decentration in the optical axis. Therefore, it is possible to correct distortion at the time of forming the plastic lens barrel and decrease forming time, and so it is possible to decrease costs.

DETAILED DESCRIPTION

Figure 1:
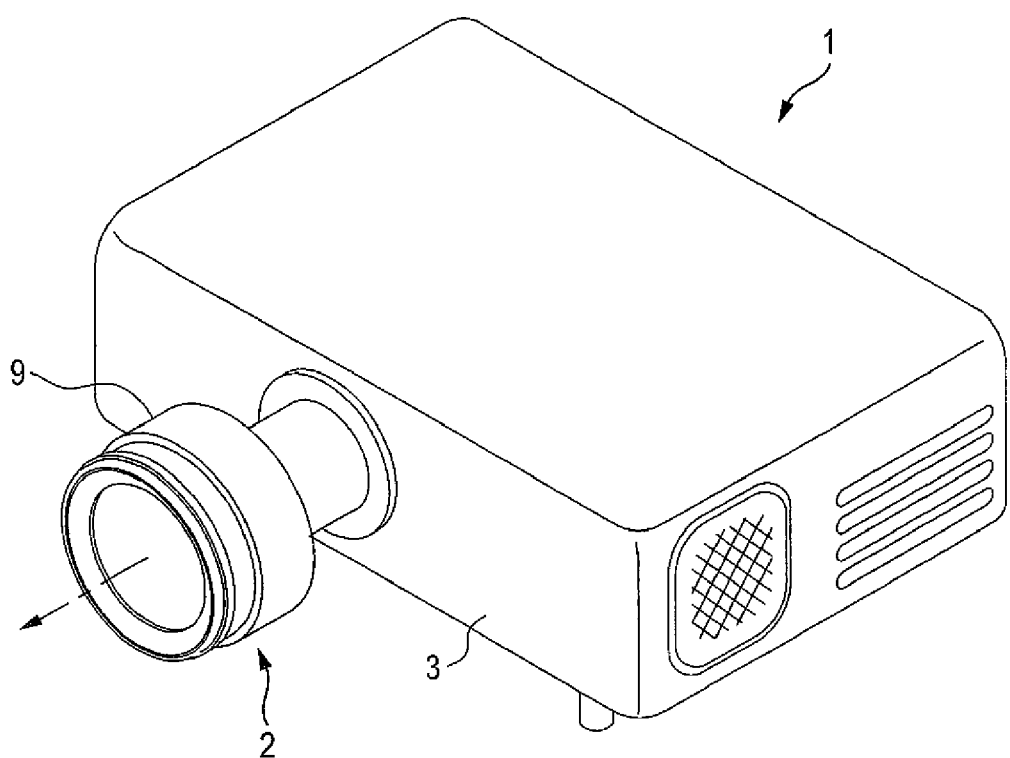
FIG. 1 is a perspective view illustrating a projector having a lens barrel mounted thereon according to the invention.

In projector 1 as shown in FIG. 1, a lens barrel 2 used as a projection lens is attached to the projector body 3. In the lens barrel 2, a zoom lens to be described later is shifted by manipulating a zoom ring 9 disposed on the lens barrel 2, and thus it is possible to change a projected image size.

Figure 2:
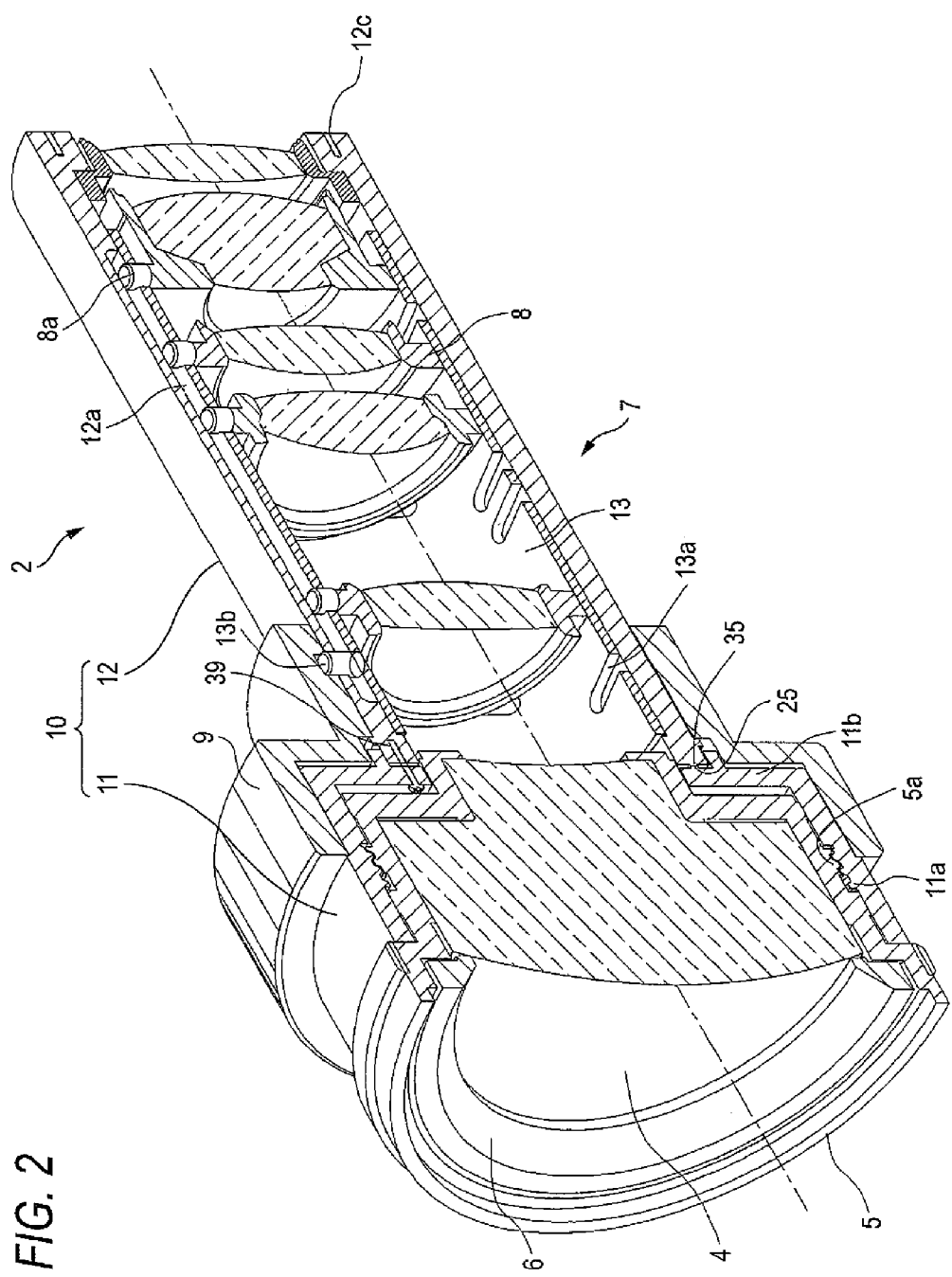
FIG. 2 is a sectional perspective view illustrating the lens barrel according to the invention.

As shown in FIG. 2, the lens barrel 2 contains a focus lens (the front group lens) 4 having a wide angle and a zoom lens (rear lens) 7 including a plurality of variable magnification optical system lens groups, inside the barrel. When the fitting portion 12c of the lens barrel 2 is fitted to a projector, image light from the projector is enlarged by transmitting through the zoom lens 7 and the focus lens 4. And the image light is projected on a screen not shown in the drawings.

The focus lens 4 is contained in a lens tub 5 and is fixed by a pressing ring 6. A helicoid gear 5a is disposed on the lens tub 5. The helicoid gear 5a and a helicoid gear 11a disposed on a front barrel 11 are fit together by screwing so that the focus lens 4 is freely shifted. With such a configuration, it is possible to adjust a focus of the image projected on the screen.

The lenses of the zoom lens 7 are fitted in a lens frame 8, and a guide shaft 8a of the lens frame 8 penetrates through a cam groove 13a of a cam barrel 13 and the guide shaft 8a is fitted into a guide groove 12a disposed on a rear barrel 12. A shaft 13b disposed on the cam barrel 13 penetrates through a hole 12b disposed on the rear barrel 12, and drives by interlocking with manipulation of the zoom ring 9. When the zoom ring 9 is manipulated, the cam barrel 13 rotates, and the guide shaft 8a configured to be only straightly movable frontward and backward by the guide groove 12a is shifted frontward and backward by a cam face of the cam groove 13a.

Figure 3:
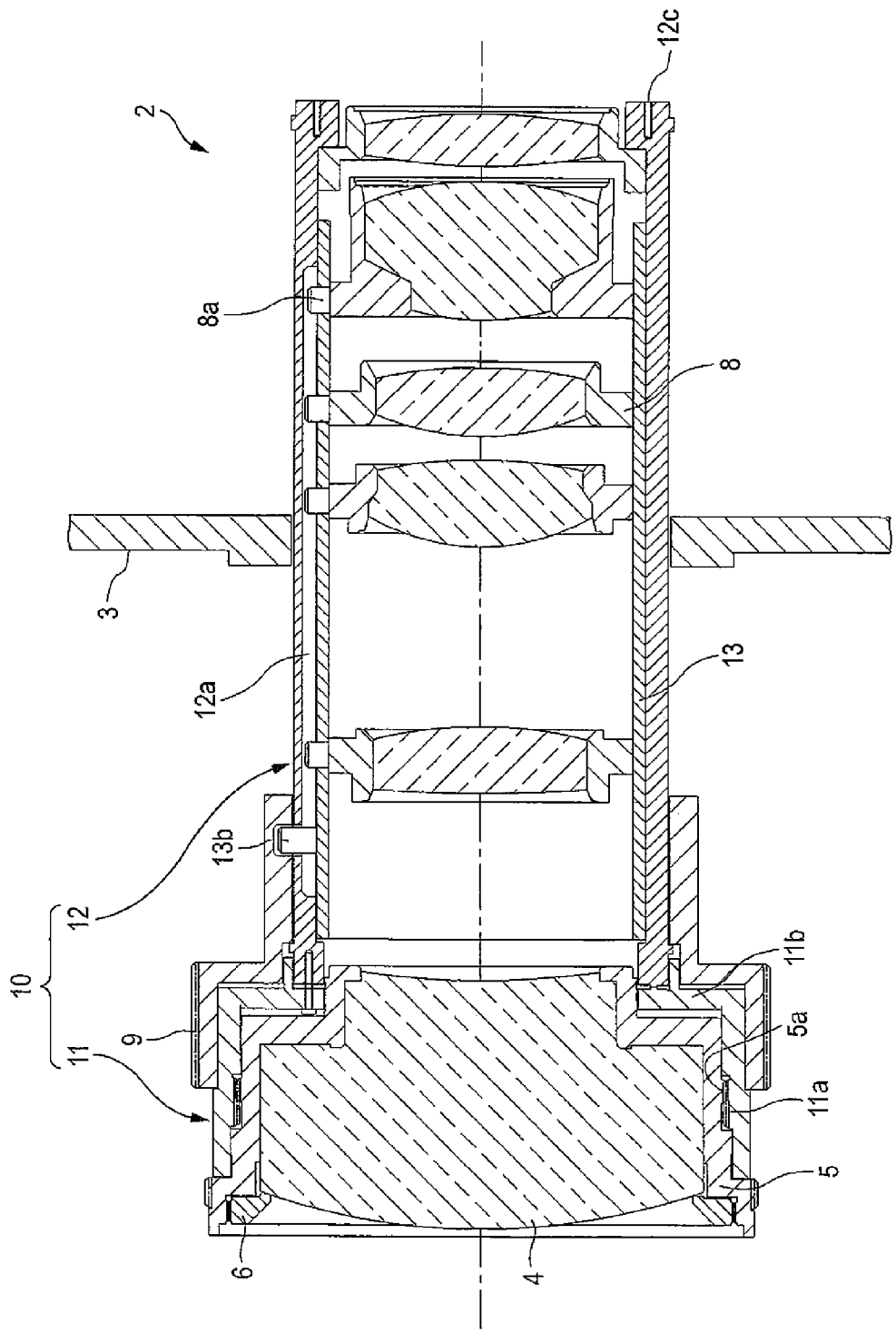
FIG. 3 is a sectional view illustrating the lens barrel according to the invention.

As shown in FIG. 3, the lenses of the zoom lens 7 is designed to have a diameter as small as possible, so that it is possible to decrease size of the rear barrel 12. Meanwhile, since the focus lens 4 has a super-wide angle, a diameter thereof is large. And an outside diameter of the front barrel 11 containing them excessively increases as compared with the rear barrel 12. Hence, diameter should be greatly changed in a connection portion of the rear barrel 12 and the front barrel 11, and wall 11b of the step is vertically formed on the rear end of the front barrel 11.

Figure 4:
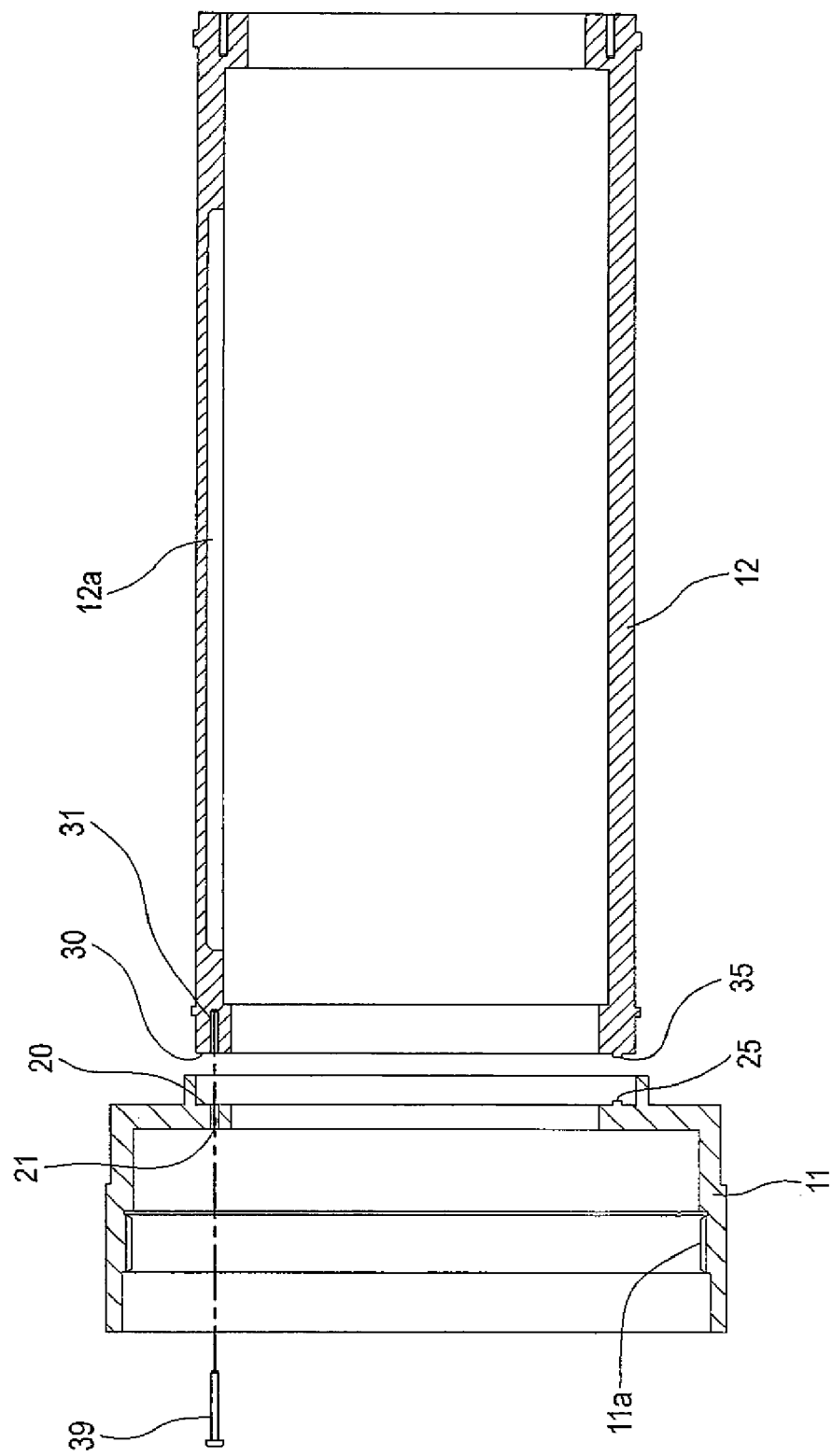
FIG. 4 is a sectional view illustrating the lens barrel before a front barrel is connected to a rear barrel.

As shown in FIG. 4, a coupling hole 21 for connecting the rear barrel 12 is disposed on a coupling face 20 in the vicinity of an opening of the wall 11b of the step disposed on the rear end of the front barrel 11. A screw hole 31 is disposed on a coupling face 30 of the rear barrel 12 facing to the coupling hole 21, and the front barrel 11 and the rear barrel 12 are connected to each other by a coupling screw 39 penetrating through the coupling hole 21 and fit into the screw hole 31. In this manner, one barrel is formed.

Figure 5:
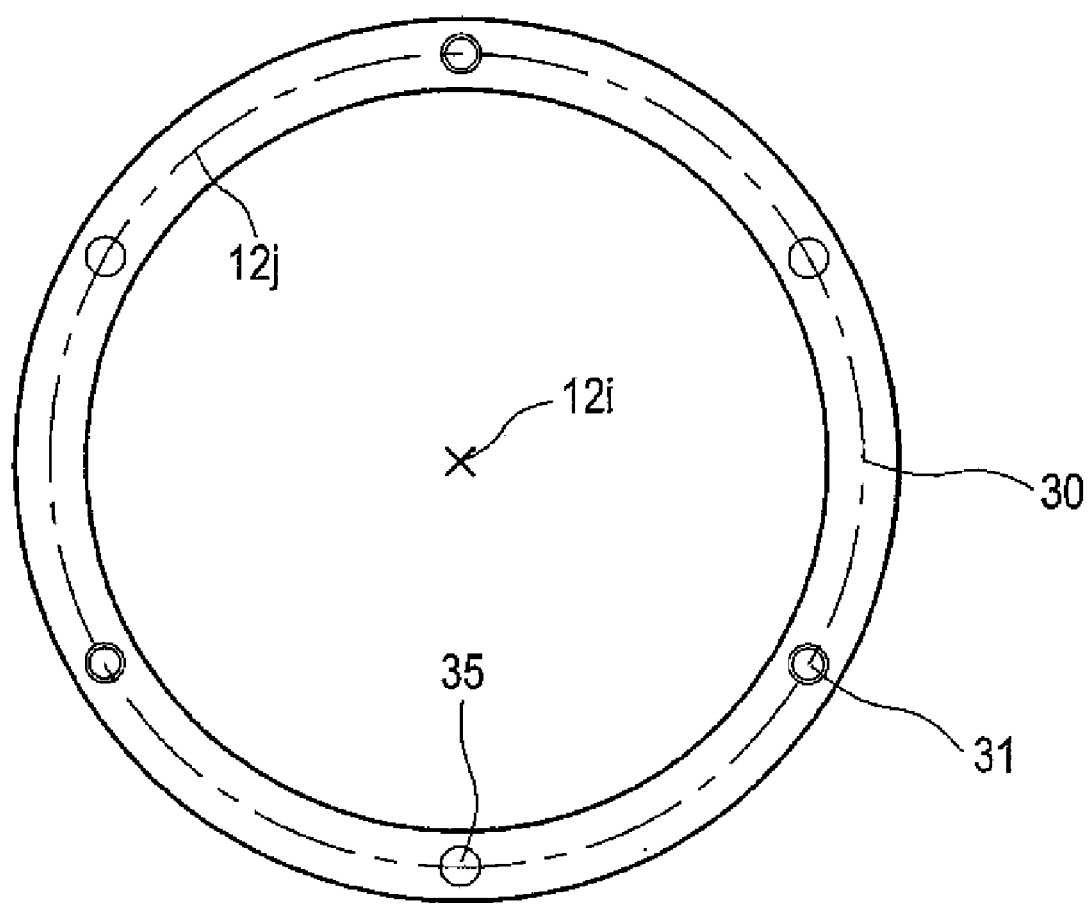
FIG. 5 is an explanatory view illustrating a coupling face of the front barrel.

As shown in FIG. 5, screw holes 31 are disposed at three locations at an angular interval of 120 degrees on a circumference of a circle 12j centered on a center 12i of the rear barrel 12 of the coupling face 30. Convex portions 35 having reference faces 35a serving as reception portion of the adjustment face are disposed at three location at an angular interval of 120 degrees on a position rotated by 60 degrees from the screw hole 31.

Figure 6:
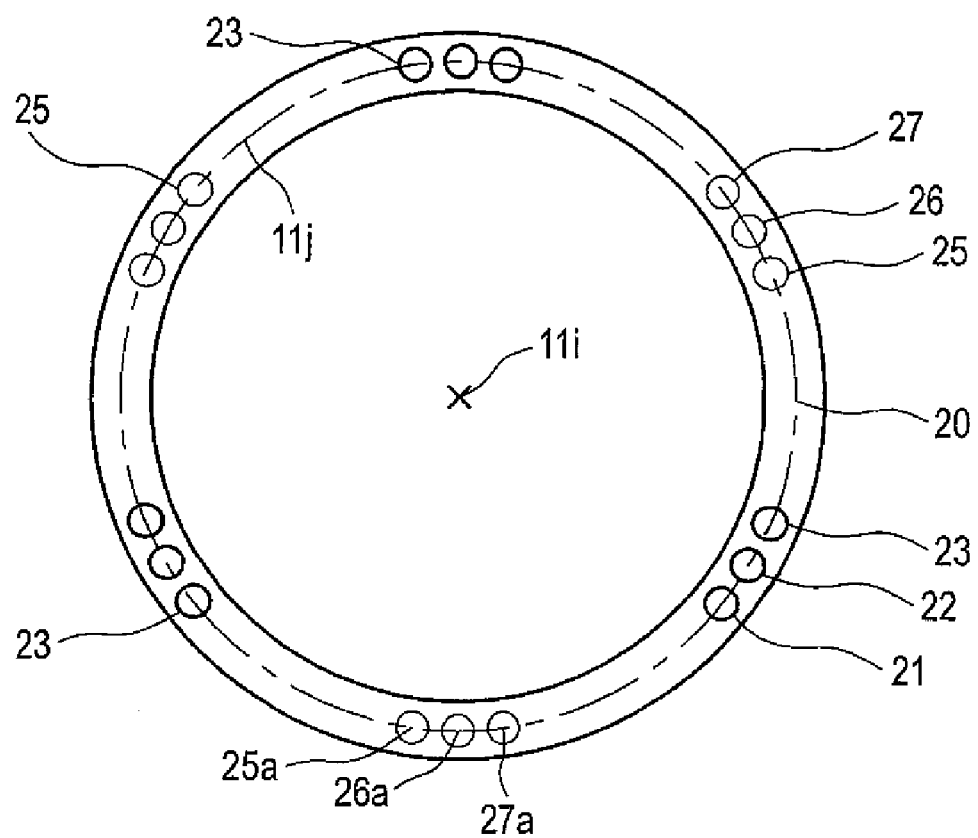
FIG. 6 is an explanatory view illustrating a coupling face of the rear barrel.

As shown in FIG. 6, the coupling holes 21 are disposed at three locations at an angular interval of 120 degrees on a circumference of a circle 11j centered on a center 111 of the front barrel 11 of the coupling face 20. On the circumference, coupling holes 22 are disposed at three locations at an angular interval of 120 degrees so as to be adjacent to the coupling holes 21, and beside the coupling holes 22, the coupling holes 23 are disposed at three locations at an angular interval of 120 degrees. The convex portions 25, 26, and 27 are disposed at three locations at an angular interval of 120 degrees on a position rotated by 60 degrees from the coupling holes 21, 22, and 23. The convex portions 25, 26, and 27 have adjustment faces 25a, 26a, and 27a formed on the top thereof. The adjustment faces 25a, 26a, and 27a are adjustment portions for adjusting the front barrel 11 and the rear barrel 12.

Figure 7:
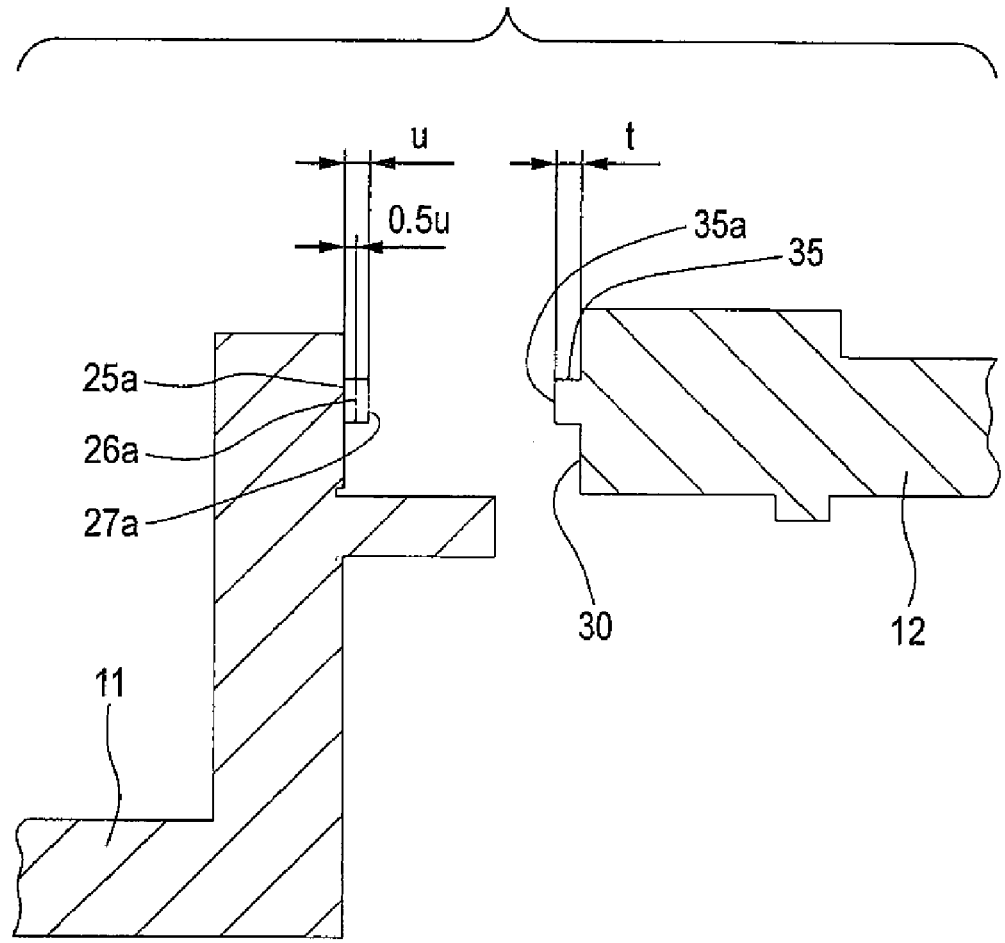
FIG. 7 is a sectional view illustrating a coupling section.

As shown in FIG. 7, convex portion 35 is made to correspond to any one of the convex portions 25, 26, and 27 disposed on the coupling face 11d, and the reference face 35a contacts with any one of the adjustment faces 25a, 26a, and 27a. Here, heights of the convex portions 25, 26, and 27, for example 0, 0.05, and 0.1 mm, are set to be slightly different from each other. In this case, a height of the convex portion 25 is 0 mm and is not set particularly, and the coupling face 20 is used as the adjustment face 25a. In addition, a height u of the convex portion 27 having the highest adjustment face 27a should be set so as not to exceed a height t of the convex portion 35 having the reference face 35a. According to which one is selected from the coupling holes 21, 22, and 23 in order to pass through the coupling screw 39, the adjustment face contacting with the reference face 35a is determined, and a distance between the coupling faces 20 and 30 is changed.

Next, working of the lens barrel according to the invention will be described with reference to FIG. 3. A portion (the rear barrel 12) containing the cam barrel 13 and the zoom lens 7 designed to have a diameter as small as possible is separated from a portion (the front barrel 11) containing the focus lens 4 having a diameter that is excessively larger than the zoom lens 7 because of a super-wide angle, and a barrel body 10 includes the two portions. The wall 11b of the step is vertically formed on the connection portion where a diameter greatly varies. However, the wall 11b is integrally formed on the front barrel 11 having a short length as a whole.

With such a configuration, a total length of the front barrel 11 and the rear barrel 12 becomes shorter than a total length before the separation. In addition, in the front barrel 11 having the step portion that causes the problem at the time of forming, even when the wall 11b of the step is integrally formed, forming ability is improved since the step has not a crank shape ahead of the separation but an L shape. In addition, in the rear barrel 12, forming ability is improved since the rear barrel 12 has a larger total length than the front barrel 11 but has a cylinder shape of which a diameter is uniformly formed without a step.

By separating the barrel into two portions, the forming ability of the barrel is excessively improved. And by forming the adjustment face on the barrel, it is possible to adjust the same error caused by a tilt of the barrel center and the lens optical axis and a slightly remaining error in lens positioning.

Figure 8:
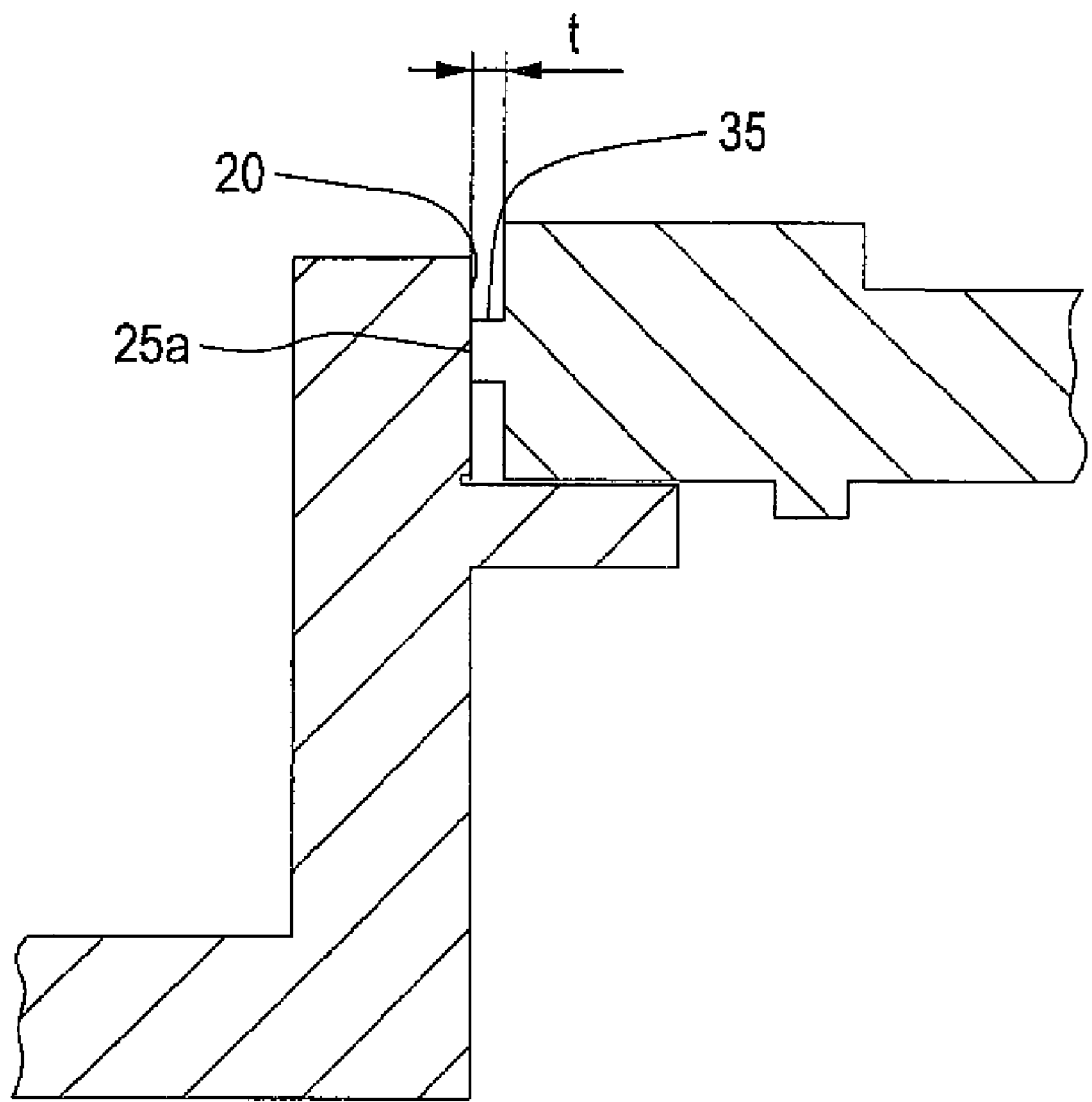
FIG. 8 is a sectional view illustrating a state where an adjustment face contacts with a reference face.

Now, the invention will be described with reference to FIG. 8. When the front barrel 11 and the rear barrel 12 are connected, the coupling holes 21 are engaged with the screw holes 31 by the coupling screws 39. In this case, the convex portions 35 contact with the convex portions 25. At this time, the adjustment face 25a of the convex portions 25 is the same as the coupling face 20, and thus a gap having a height t of the convex portion 35 is formed between the coupling faces 20 and 30.

Figure 9:
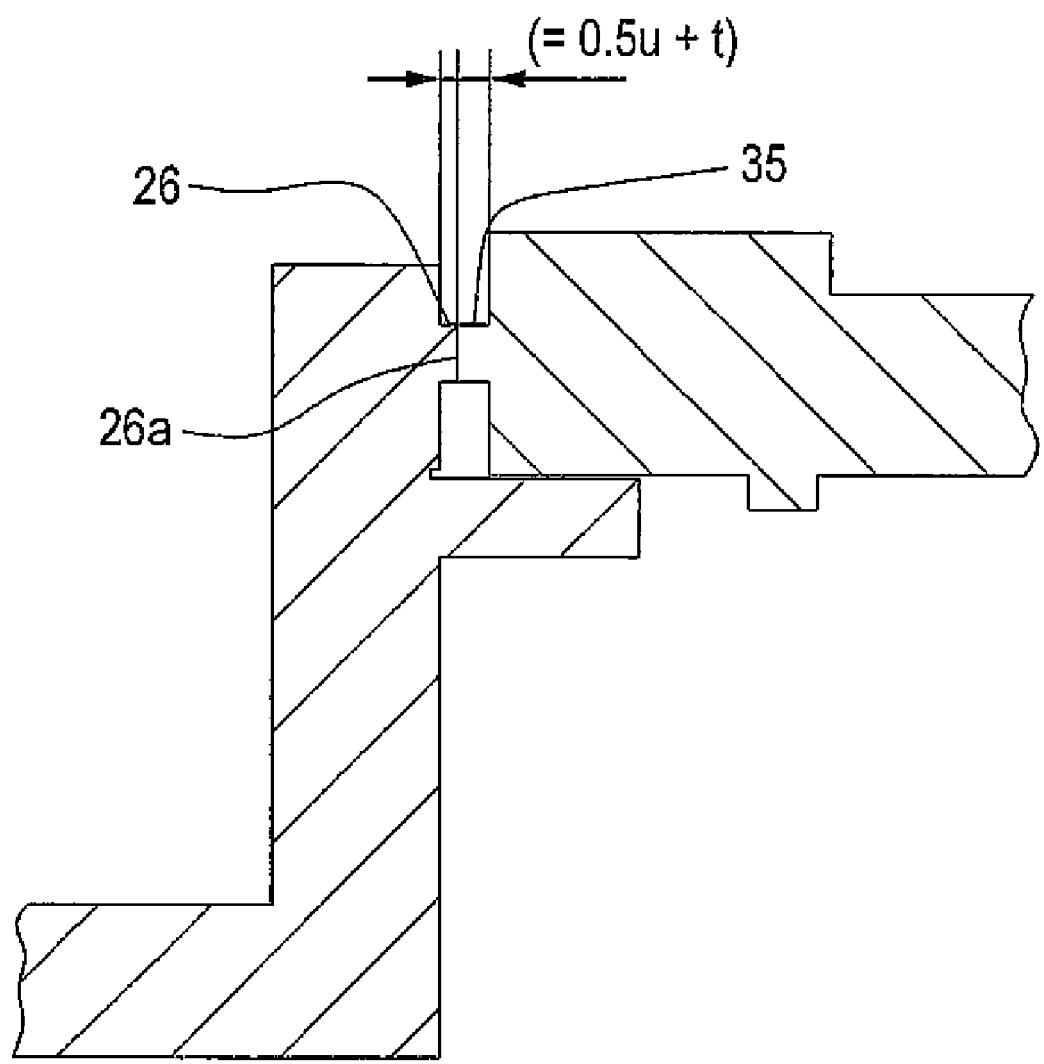
FIG. 9 is a sectional view illustrating another portion in a state where other adjustment face contacts with the reference face.

When the front barrel 11 and the rear barrel 12 are connected by bringing the adjustment face 25a and the reference face 35a into contact with each other, a distance between the focus lens 4 and the zoom lens 7 is narrowly formed. Accordingly, when there is a need to slightly increase the distance, the coupling screw 39 is fit into the screw holes 31 through the coupling hole 22 by screwing. With such a configuration, the reference face 35a and the adjustment face 26a contact with each other as shown in FIG. 9. In this case, a height of the adjustment face 26a is 0.5 u as shown in the drawings, the gap between the coupling faces 20 and 30 is equal to 't+0.5 u', and thus it is possible to slightly increase the gap as compared with the case of the adjustment face 25a.

Figure 10:
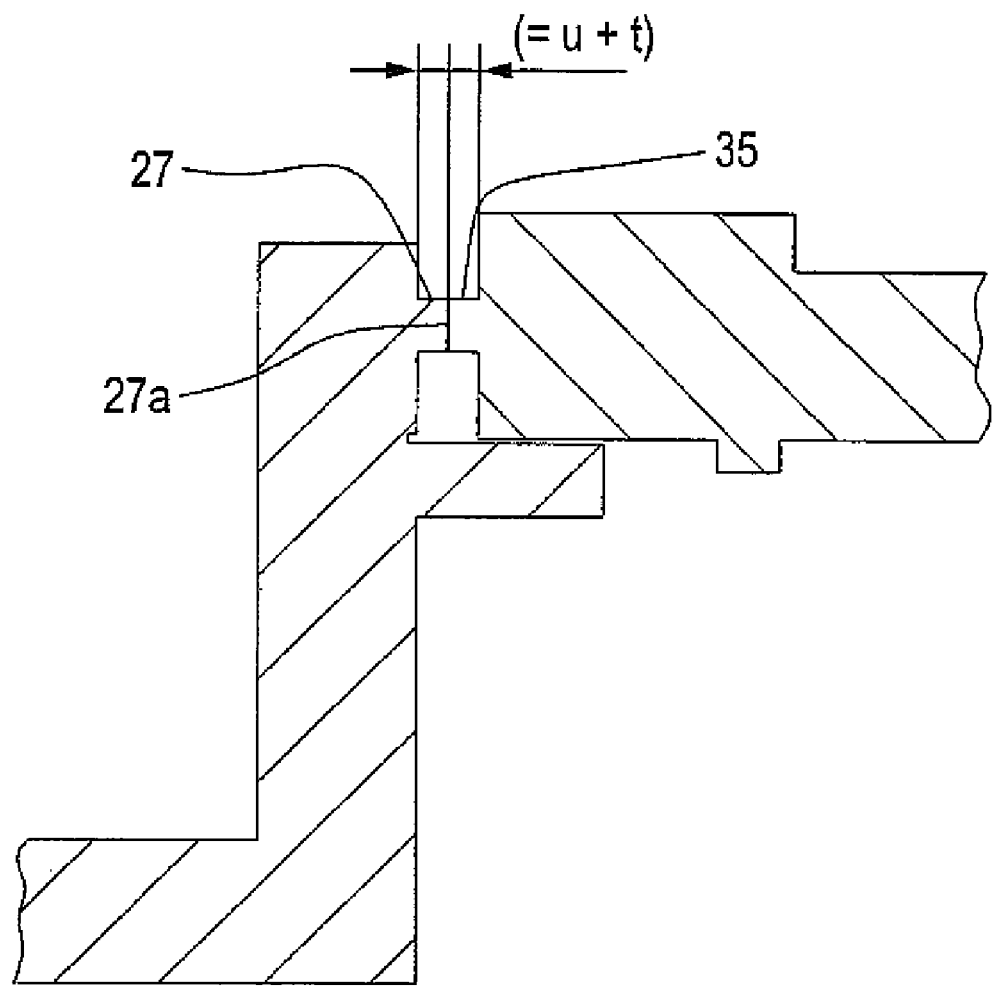
FIG. 10 is a sectional view illustrating another portion in a state where other adjustment face contacts with the reference face.

When correction amount is not enough even by performing the adjustment, the coupling screw 39 is fit into the screw holes 31 through the coupling hole 23 by screwing. With such a configuration, the reference face 35a and the adjustment face 27a contact with each other as shown in FIG. 10. In this case, a height of the adjustment face 27a is u as shown in the drawings and is further larger than a height of the adjustment face 26a, and thus it is possible to further increase the gap between the coupling faces 20 and 30. In this manner, it is possible to adjust the distance between the focus lens 4 and the zoom lens 7.

As described above, the focus lens 4 and the zoom lens 7 are appropriately set by adjusting the coupling distance between the front barrel 11 and the rear barrel 12, and thus it is possible to form a high-accuracy lens barrel by correcting distortion at the time of forming the two barrels.

Figure 11:
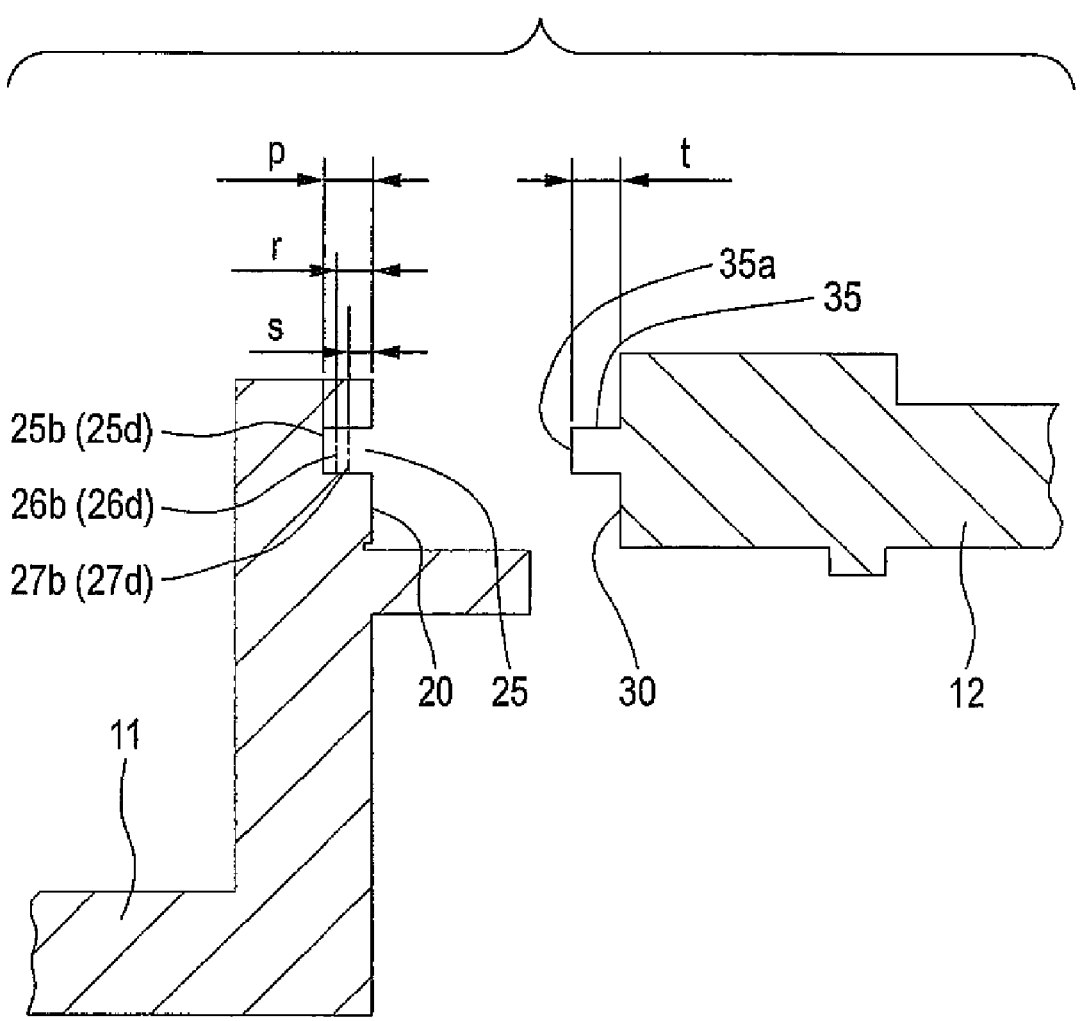
FIG. 11 is a sectional view illustrating the coupling section where the adjustment face is disposed on a concave portion.
Figure 12:
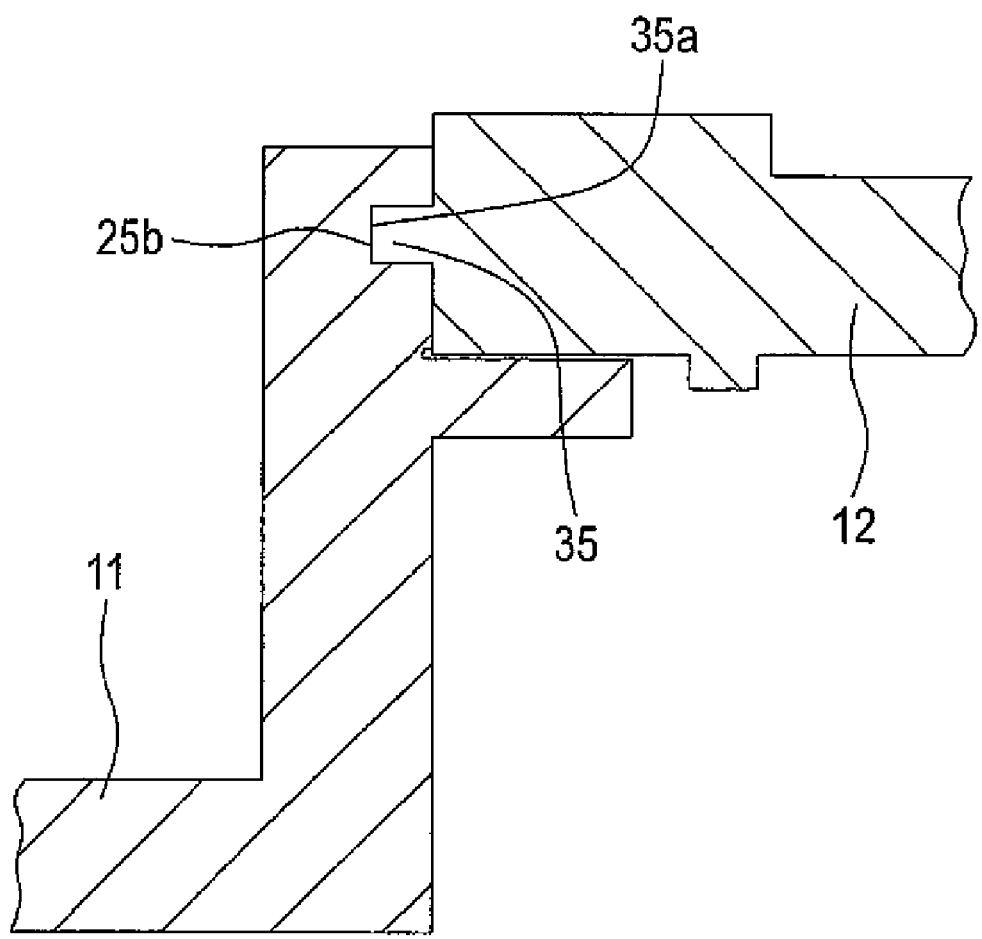
FIG. 12 is a sectional view illustrating a state where an adjustment face contacts with a reference face.

In the embodiment, the adjustment faces 25a, 26a, and 27a are disposed on the front end of the convex portions 25, 26, and 27, but it is also allowed to dispose on the bottom face of the concave portion as shown in FIG. 11. In this case, the adjustment faces of the concave portions 25d, 26d, and 27d are denoted by reference numerals 25b, 26b, and 27b, and the depths thereof are denoted by reference numerals p, r, and s. As shown in FIG. 12, the convex portion 35 is fit into the concave portion 25d. In this case, a depth p of the adjustment face 25b that is the bottom face of the concave portion 25d is the same as the height t of the convex portion 35. Therefore, the adjustment face 25b and the reference face 35a closely contact with each other. In addition, the coupling faces 20 and 30 closely contact with each other.

Figure 13:
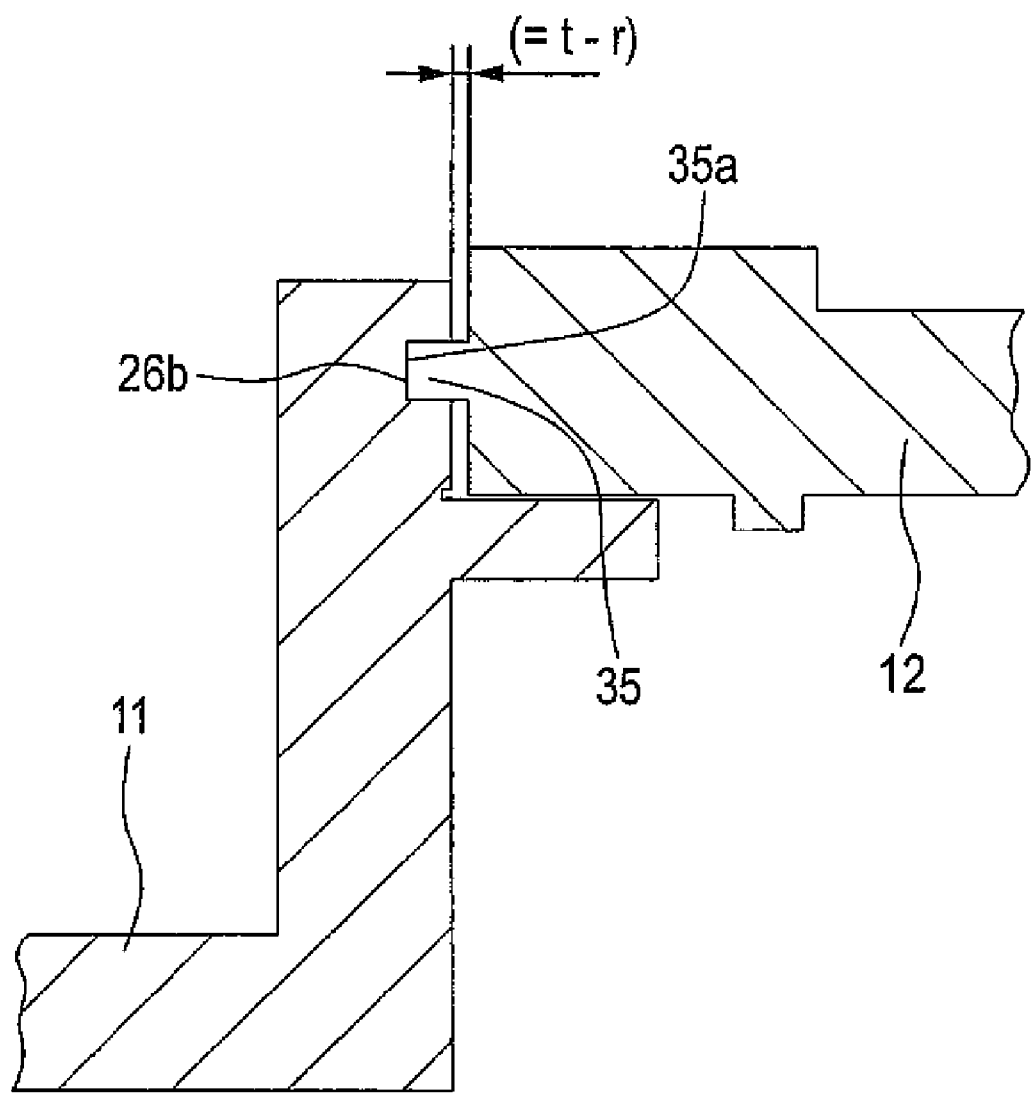
FIG. 13 is a sectional view illustrating another portion in a state where another adjustment face contact with the reference face.

As shown in FIG. 13, when the convex portion 35 is fit into the concave portion 26d, the reference face 35a and the adjustment face 26b contact with each other. In this case, a depth r of the adjustment face 26b is smaller than the height t of the convex portion 35. Hence, the convex portion 35 does not completely enter the concave portion 26d, and a slight gap (=t−r) is formed between the coupling face 20 and the coupling face 30. Thus, it is possible to correct the distance between the focus lens 4 and the zoom lens 7.

Figure 14:
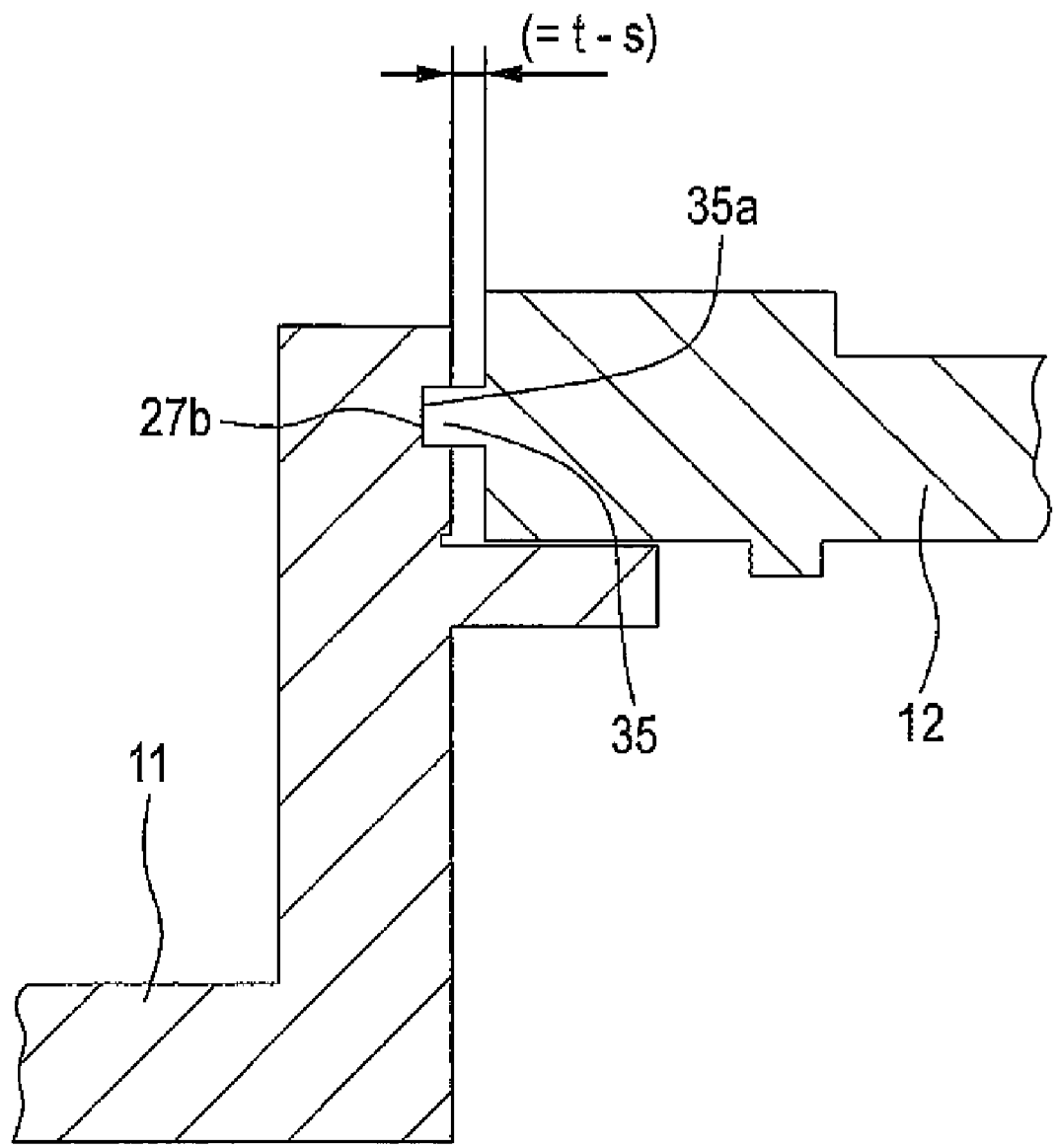
FIG. 14 is a sectional view illustrating another portion in a state where another adjustment face contacts with the reference face.

As shown in FIG. 14, when the convex portion 35 is fit into the concave portion 27d, the reference face 35a and the adjustment face 27b contact with each other. In this case, a depth s of the adjustment face 27b is lower than a depth of the adjustment face 26b. Hence, an fitting amount between the convex portion 35 and the concave portion 27d is small, and a gap (=t−s) is formed between the coupling face 20 and the coupling face 30. Thus, it is possible to correct the distance between the focus lens 4 and the zoom lens 7.

In the embodiments, three convex portions or three concave portions having adjustment faces are formed as one set and three sets thereof are provided. However, the invention is not limited to three sets, and it is also allowed to provide several sets. The convex portions or the concave portions having adjustment faces are disposed the front barrel 4, but it is also allowed to dispose on the rear barrel 7. In addition, three convex portions or three concave portions having adjustment faces are formed as one set, but it is also allowed to form four of them as one set or five of them as one set.

Figure 15:
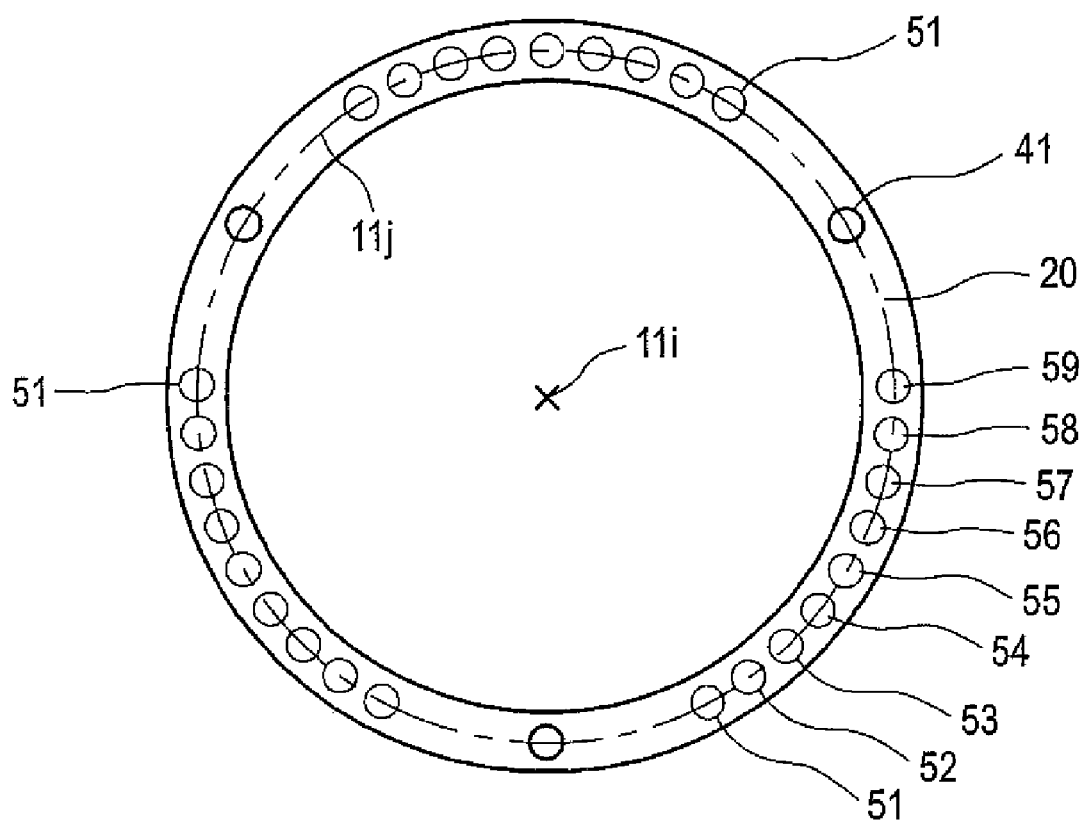
FIG. 15 is an explanatory view illustrating a coupling face of a front barrel according to the second embodiment.

Next, a connection portion and an adjustment portion according to the second embodiment will be described. As shown in FIG. 15, in the coupling face 20 of the front barrel 11, convex portions 41 are disposed at three locations at an angular interval of 120 degrees on the circumference of the circle 11j centered on a center 11i of the front barrel 11. The convex portions 41 has reference faces 41a for adjusting the optical axis of the lens in contact with the adjustment faces of the rear barrel 12 to be described later. In addition, on the circumference, coupling holes 51 are disposed at three locations on a position rotated by 28 degrees from the convex portions 41 disposed at three locations in a counterclockwise direction. The coupling holes 51 are penetrated by the screw 39 connecting the front barrel 11 and the rear barrel 12. The coupling holes 52, 53, 54, 55, 56, 57, 58, and 59 are disposed at an angular interval of 8 degrees from the coupling hole 51 in the counterclockwise direction. The front barrel 11 and the rear barrel 12 are connected to each other by selecting any one set from three coupling holes 51, 52, 53, 54, 55, 56, 57, 58, and 59 formed as one set. Thus, proper one set is selected from the adjustment face of the rear barrel 12 to be described later by the convex portion 41.

Figure 16:
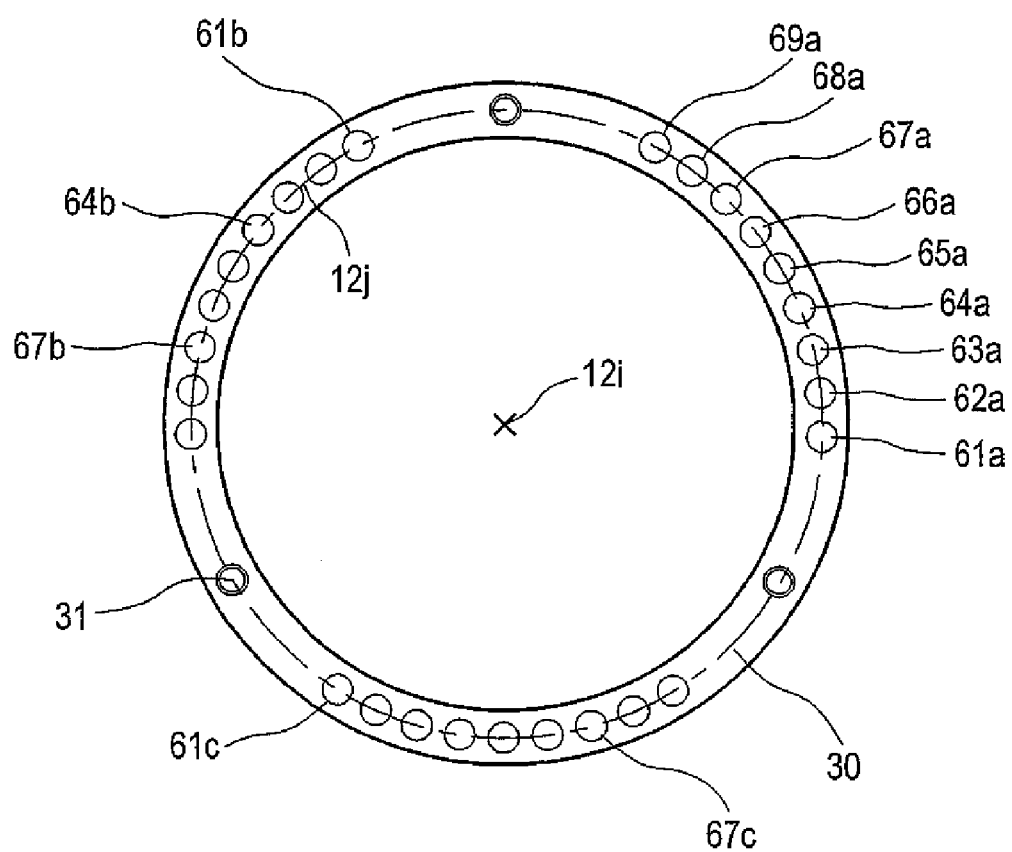
FIG. 16 is an explanatory view illustrating the coupling face of a rear barrel according to the second embodiment.

As shown in FIG. 16, in the coupling face 30 of the rear barrel 12, the screw holes 31 are disposed at three locations at an angular interval of 120 degrees on the circumference of the circle 12j centered on the center 12i of the rear barrel 12. On the circumference, convex portions 61a, 61b, and 61c are disposed at three locations at an angular interval of 120 degrees on a position rotated by 28 degrees from the screw holes 31 disposed at three locations in the counterclockwise direction. The convex portions 61a, 61b and 61c have adjustment faces 71a, 71b and 71c for adjusting the optical axis of the lens in contact with the reference face 41a. In addition, convex portions 62a, 63a, 64a, 65a, 66a, 67a, 68a and 69a are disposed at an angular interval of 8 degrees from the convex portion 61a in the counterclockwise direction. Convex portions 62b, 63b, 64b, 65b, 66b, 67b, 68b and 69b are disposed at an angular interval of 8 degrees from the convex portion 61b in the counterclockwise direction. Convex portions 62c, 63c, 64c, 65c, 66c, 67c, 68c and 69c are disposed at an angular interval of 8 degrees from the convex portion 61c in the counterclockwise direction. In all front ends of the convex portions, the adjustment faces are provided. In addition, three elements having the same reference numerals and noted by the reference signs a, b, and c are formed as one set, and total nine sets are provided.

In combinations between heights of the three convex portions formed as one set, the nine sets of the convex portions have not all the same value with each other in three heights thereof. For example, heights of three convex portions 65a, 65b, and 65c are set by 0.1 mm which is the same for all. However, heights of three convex portions 61a, 61b, and 61c are different for all three. Here, the convex portion 61a has 0, the convex portion 61b has 0.05 mm, and the convex portion 61c has 0.1 mm, or the convex portions 67a and 67b has 0.1 mm, and the convex portion 67c has 0.15 mm.

Figure 17:
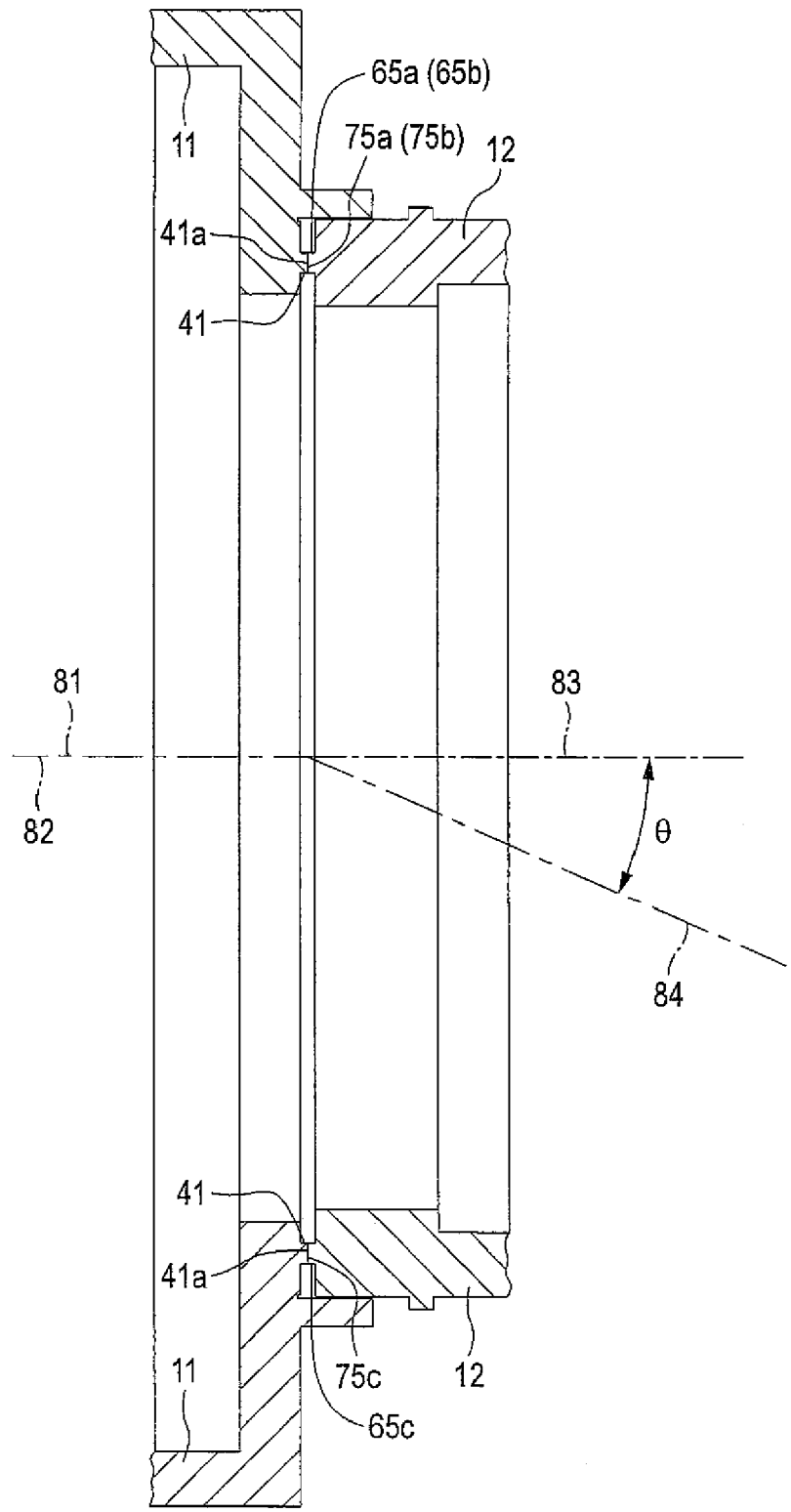
FIG. 17 is an explanatory view illustrating state where a coupling section of the second embodiment is coupled.

For example, as shown in FIG. 17, when the coupling screws 39 connect the front barrel 11 and the rear barrel 12 by selecting the coupling holes 55, the reference faces 41a disposed on the front barrel 11 directly contact adjustment faces 75a, 75b, and 75c disposed on the rear barrel 12. Heights of the convex portions 65a, 65b, and 65c provided with the adjustment faces 75a, 75b, and 75c are all the same value of 0.1 mm. Thus, a center 81 of the front barrel coincides with a center 83 of the rear barrel. At this time, an optical axis 82 of the focus lens 4 coincides with the center 81 of the front barrel, but an optical axis 84 of the light emitted from the zoom lens 7 does not coincide with the center 83 of the rear barrel and is inclined at an angle of θ. In addition, a position of the focus lens 4 relative to the zoom lens 7 slightly shifts backward.

Figure 18:
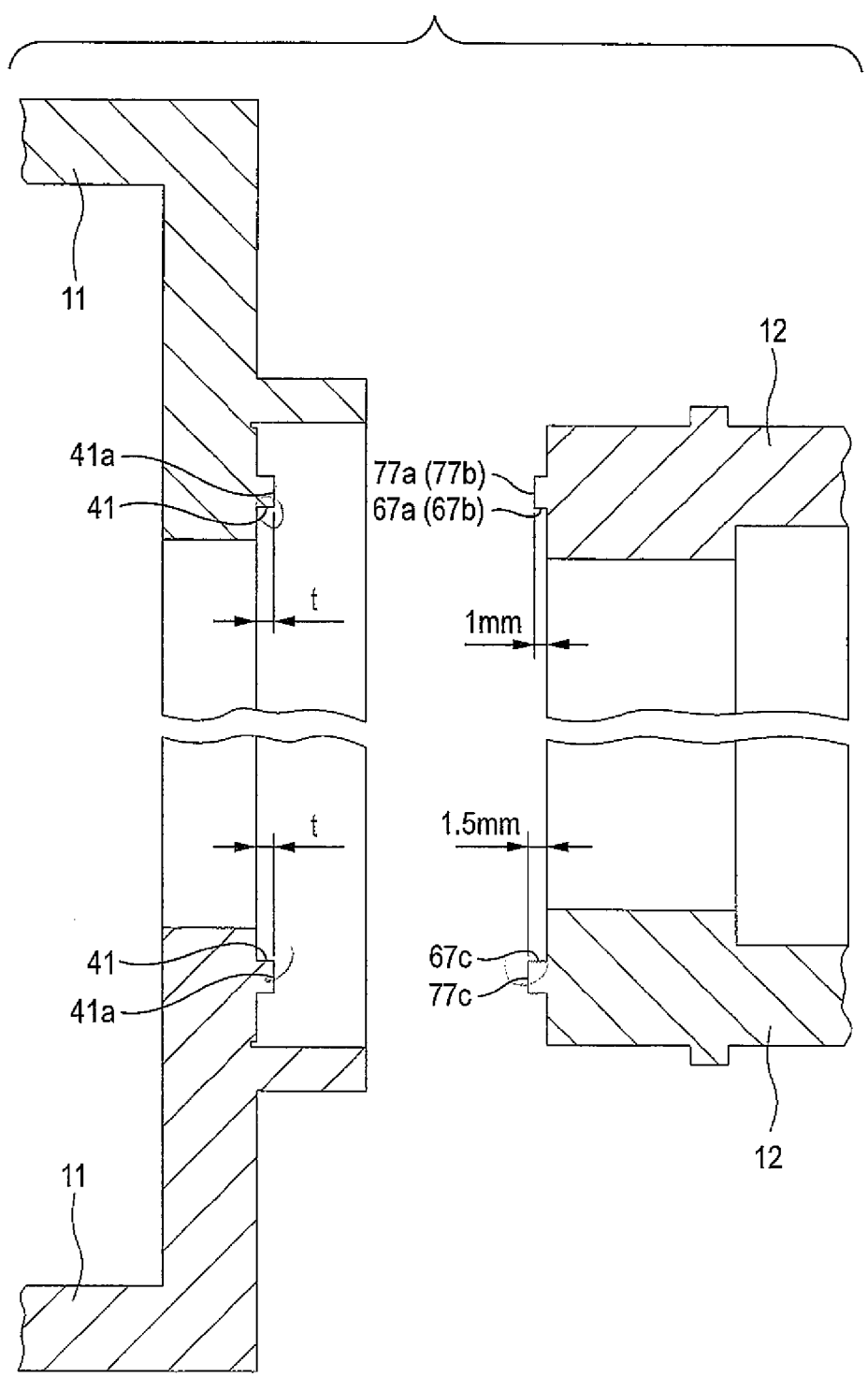
FIG. 18 is a sectional view illustrating another portion of an adjustment face according to the second embodiment.

To correct the aforementioned situation, a combination is made by selecting the coupling hole 57 so that the reference face 41a contact with adjustment faces 77a, 77b, and 77c. As shown in FIG. 18, a height of the convex portions 67a and 67b provided with the adjustment faces 77a and 77b is 1 mm, and a height of the convex portion 67c provided with the adjustment face 77c is 1.5 mm. The plane formed by three adjustment faces 77a, 77b, and 77c corresponds to a tilt and a position for correcting deviation amount of the center 83 of the rear barrel and the optical axis 84 as described above.

Figure 19:
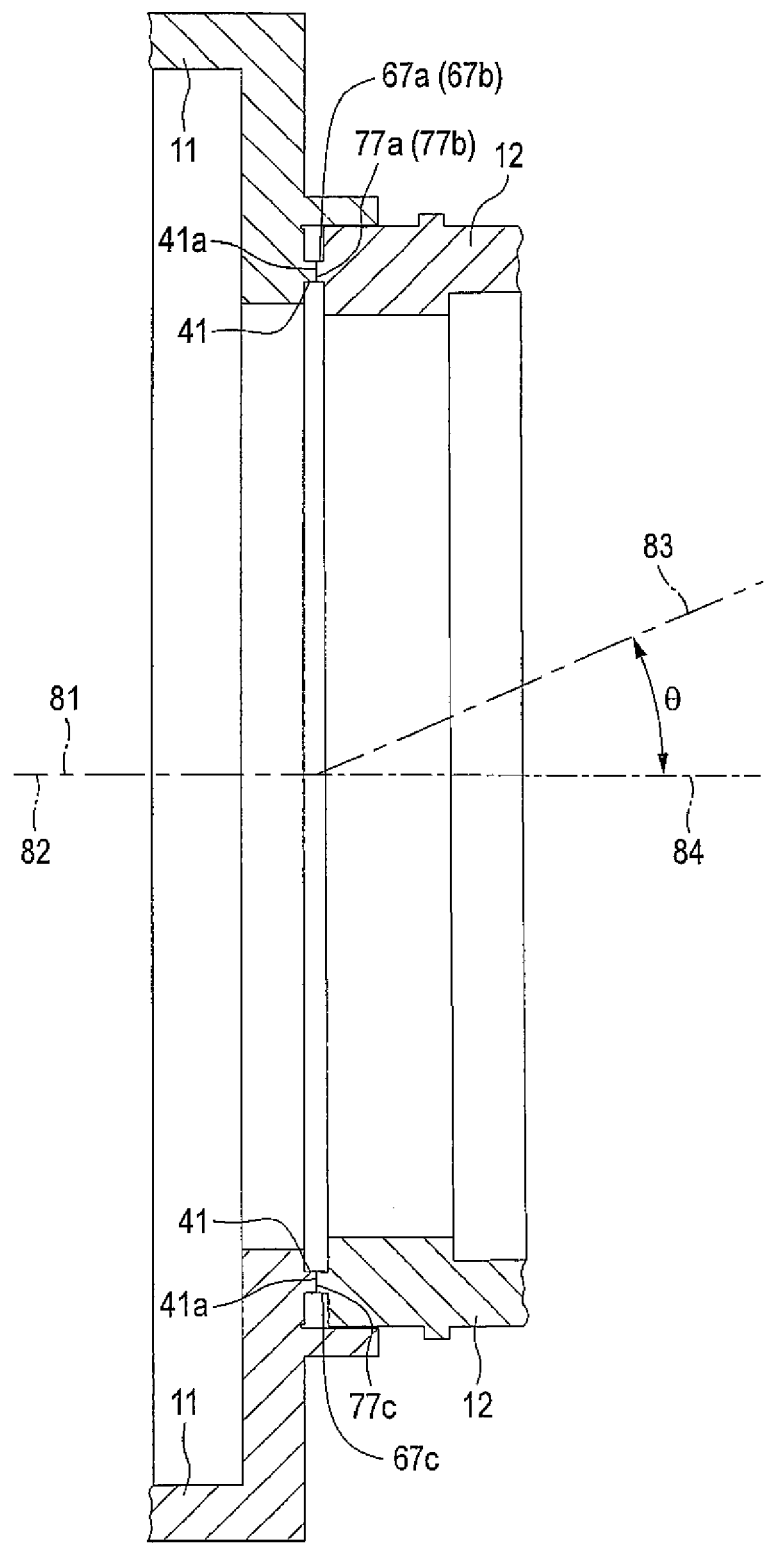
FIG. 19 is a sectional view illustrating another portion in a state where another adjustment face contacts with the reference face.

As shown in FIG. 19, the coupling screws 39 connect the front barrel 11 with the rear barrel 12 by selecting the coupling holes 57 while inclined direction of the optical axis formed by three adjustment faces 77a, 77b, and 77c is checked. In this case, the reference face 41a disposed on the front barrel 11 contacts with the adjustment faces 77a, 77b, and 77c disposed on the rear barrel 12. In addition, it is possible to make the optical axis 82 of the focus lens 4 and the optical axis 84 of the light emitted from the zoom lens 7 coincide with each other.

Figure 20:
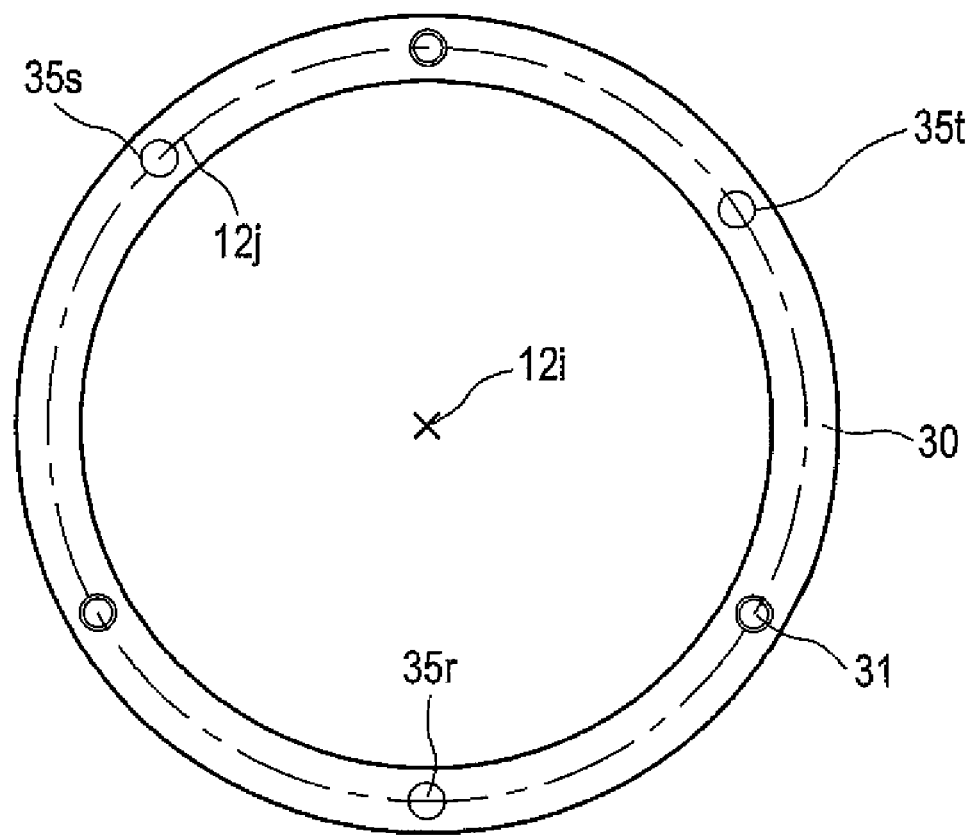
FIG. 20 is an explanatory view illustrating a coupling face of the front barrel according to the third embodiment.
Figure 21:
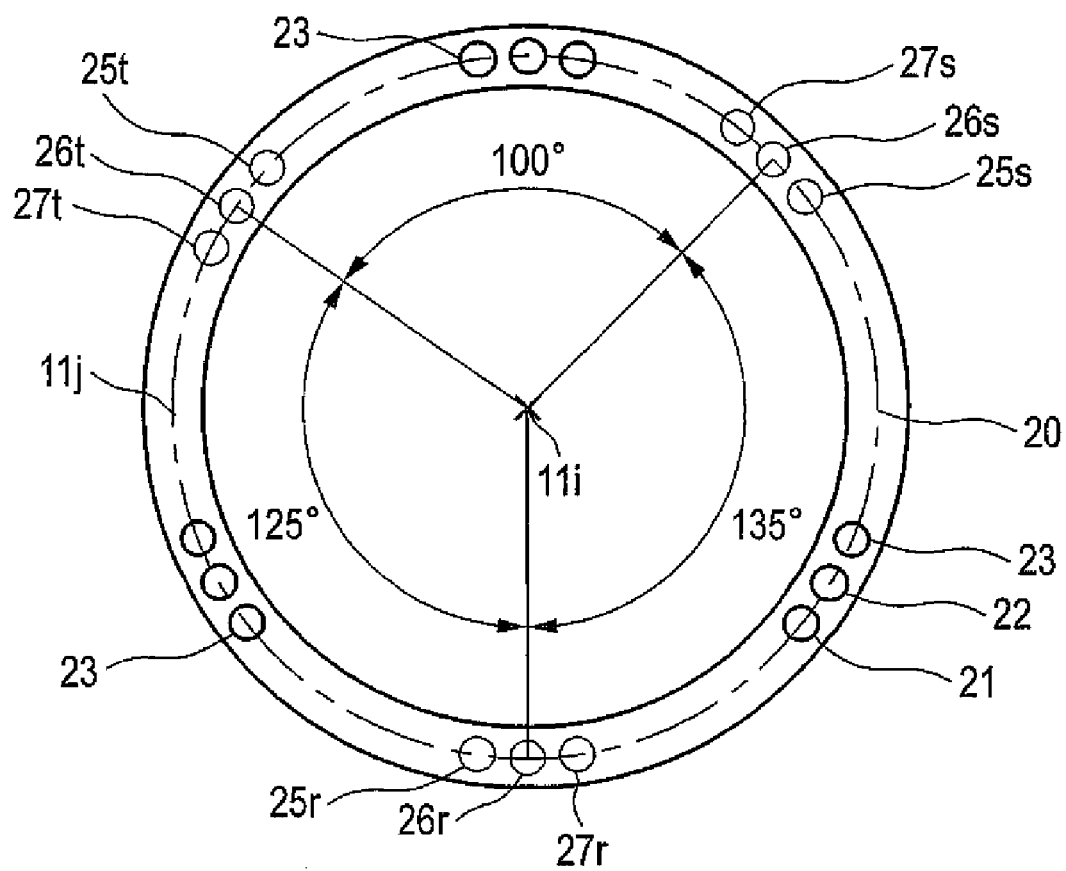
FIG. 21 is an explanatory view illustrating a coupling face of the rear barrel according to the third embodiment.

Next, a connection portion and an adjustment portion according to the third embodiment will be described. As shown in FIG. 20, two of positions of the convex portions 35 disposed on the coupling face 30 of the rear barrel 12 are changed from the position shown in FIG. 5. A position of a convex portion 35r is set to be the same as the position shown in FIG. 5, a position of a convex portion 35s is set to be rotated by 15 degrees in a clockwise direction from the position shown in FIG. 5, and a position of a convex portion 35t is set to be rotated by 5 degrees in the counterclockwise direction.

As shown in FIG. 20, corresponding to this, positions of the convex portions 25 disposed on the coupling face 20 of the front barrel 11 are also changed from the position shown in FIG. 6. For example, a convex portion 26r corresponds to the convex portion 35r, a convex portion 26s is rotated by 15 degree in the counterclockwise direction, and a convex portion 26t is rotated by 5 degree in the clockwise direction. An angular interval between the convex portion 26r and the convex portion 26s is 135 degrees, an angular interval between the convex portion 26s and the convex portion 26t is 100 degrees, and an angular interval between the convex portion 26r and the convex portion 26t is 125 degrees. As described above, in one set of the convex portions, the circumference of the coupling face 20 or 30 may be not always divided into equal portions.

In the embodiments, the lens barrel is used as a projection lens of a projector, but may be used in, for example, a photographing lens of a camera and the like.

What is claimed is:

1. A lens barrel for a projector including a front group lens projecting an image on a screen and a rear group lens formed of a plurality of lenses shifting through a cam barrel, respectively, the lens barrel comprising:
    a rear barrel which is formed of resin and contains the rear group lens; and
    a front barrel which is formed of resin and contains the front group lens,
    wherein the front group lens is disposed to be focusable,
    an inner diameter of a portion containing the front group lens of the front barrel, is 1.15 times or more as large as an inner diameter of a portion containing the rear group lens of the rear barrel, and
    wherein the front barrel and the rear barrel are coupled by a connection portion, and
    wherein three reference faces are disposed on three locations dividing a circumference centered on an optical axis into three equal portions,
    the three reference faces have the same positions in an optical axis direction, and
    the three reference faces are integrally formed on coupling face of the front barrel or coupling face of the rear barrel, and
    wherein three adjustment faces are disposed on three locations dividing a circumference centered on an optical axis into three equal portions,
    the three adjustment faces have the same positions in the optical axis direction,
    the three adjustment faces are integrally formed as one set on the other coupling face, and
    plural sets of the adjustment faces are provided with change of the positions in the optical axis direction.

2. A lens barrel for a projector including a front group lens projecting an image on a screen and a rear group lens formed of a plurality of lenses shifting through a cam barrel, respectively, the lens barrel comprising:
a rear barrel which is formed of resin and contains the rear group lens; and
a front barrel which is formed of resin and contains the front group lens,
wherein the front group lens is disposed to be focusable,
an inner diameter of a portion containing the front group lens of the front barrel, is 1.15 times or more as large as an inner diameter of a portion containing the rear group lens of the rear barrel, and
wherein the front barrel and the rear barrel are coupled by a connection portion, and
wherein N adjustment portions are disposed on N locations which are at least three or more formed as one set, and
plural sets of the adjustment potions are provided on any one or both of the coupling faces of the front barrel and the rear barrel, and
the plural sets of the adjustment portions includes a combination in which at least one position of one set in the optical axis direction is set to be different in the optical axis from another position of the one set, and
a combination of positions of one set is different in the optical axis direction from a combination of positions of another set.

3. The lens barrel according to claim 2,
wherein the N adjustment portions formed as one set are arranged at an equal distance from each other on the circumference centered on the optical axis.

* * * * *